United States Patent
Iwao et al.

(10) Patent No.: US 8,133,152 B2
(45) Date of Patent: Mar. 13, 2012

(54) CONTROL DEVICE FOR POWER TRANSMISSION DEVICE FOR VEHICLES

(75) Inventors: Nobuyuki Iwao, Kanagawa (JP); Hiroshi Usuba, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 408 days.

(21) Appl. No.: 12/312,426

(22) PCT Filed: Nov. 19, 2007

(86) PCT No.: PCT/JP2007/072372
§ 371 (c)(1),
(2), (4) Date: Jul. 22, 2009

(87) PCT Pub. No.: WO2008/062749
PCT Pub. Date: May 29, 2008

(65) Prior Publication Data
US 2009/0325759 A1    Dec. 31, 2009

(30) Foreign Application Priority Data
Nov. 22, 2006 (JP) .................. 2006-315899

(51) Int. Cl.
*B60W 10/00* (2006.01)
(52) U.S. Cl. ........................................... 477/78
(58) Field of Classification Search .............. None
See application file for complete search history.

(56) References Cited

U.S. PATENT DOCUMENTS

| | | | |
|---|---|---|---|
| 5,839,987 A | 11/1998 | Sawamura et al. | |
| 2007/0173374 A1 | 7/2007 | Hayashi | |
| 2010/0004091 A1* | 1/2010 | Iwao et al. | 477/32 |
| 2010/0062898 A1* | 3/2010 | Iwao et al. | 477/80 |

FOREIGN PATENT DOCUMENTS

| | | |
|---|---|---|
| JP | 9-296745 | 11/1997 |
| JP | 3724491 B2 | 9/2005 |

* cited by examiner

*Primary Examiner* — Dirk Wright
(74) *Attorney, Agent, or Firm* — McGinn IP Law Group, PLLC

(57) ABSTRACT

A power transmission device for a vehicle having a clutch 3 between an engine 1 and a transmission 4, preventing variation in the engine torque and shift shock when the engine control mode returns from an engine control at the time of shifting back to an accelerator pedal follow-up control for normal traveling. Timer means 62 is provided for a clutch control device 6 that executes the control for disengaging the clutch 3 at the time of shifting and engaging it after the completion of the shifting. The timer means 62 controls a moment for starting the clutch engagement control depending on the engine conditions, etc. The state of increasing the amount of clutch engagement varies and the state of engine rotational speed varies, too. When the engine control at the time of shifting is returned back to the accelerator pedal follow-up control at the time of normal traveling, therefore, the engine can be placed in a condition where the engine torque does not vary despite the control mode is changed over.

4 Claims, 5 Drawing Sheets

CONTROL DEVICE FOR POWER TRANSMISSION DEVICE FOR VEHICLES

TECHNICAL FIELD

This invention relates to a control device for a power transmission device for a vehicle having a clutch between an engine and a transmission and, particularly, to a control device for a power transmission device for a vehicle equipped with an engine control device for executing an accelerator pedal follow-up control using the amount the accelerator pedal is depressed as a basic parameter and a clutch control device for controlling the amount of engaging the clutch.

BACKGROUND ART

It is a modern trend of the vehicles to employ a power transmission device for vehicles which automatically executes the shifting operation or the clutch operation for easy driving. One of such power transmission devices for vehicles is a power transmission device used for diesel engine-mounted vehicles, employing a transmission of the type of parallel shaft gear mechanism, arranging an automatic clutch, and interposing a fluid coupling between the engine and the automatic clutch as disclosed in, for example, Japanese Patent No. 3724491 (patent document 1) assigned to the present applicant.

The engine for the power transmission device (see FIG. 4) described in the patent document 1 is equipped with an engine control device which determines the amount of feeding the fuel (fuel injection amount) depending upon the amount the accelerator pedal is depressed and the engine rotational speed. When normally traveling, the fuel injection amount is controlled by using the amount the accelerator pedal is depressed as a basic parameter (accelerator pedal follow-up control). At the time of shifting by disengaging the clutch for shifting attempt, the engine control device assumes a control mode to control the engine (engine control at the time of shifting) independently of the amount the accelerator pedal is depressed to cope with a sharp decrease in the engine load stemming from the disengagement of the clutch and resumes the accelerator pedal follow-up control at a moment when the clutch is engaged. The change-over of the control mode is effected not only in the power transmission device interposing a fluid coupling but also in the power transmission devices for vehicles in general.

FIG. 5 is a timing diagram of a power transmission device of a vehicle (automobile) equipped with an engine control device for executing the above-mentioned controls, a clutch control device for controlling the amount of engaging the clutch and a shift control device for controlling the operation of the transmission, and shows operation characteristics of these control devices at the time of shifting. The amount of engaging the clutch is controlled depending upon the duty ratio D(%) of pulses output from the clutch control device same as the one described in the patent document 1; i.e., the clutch is completely engaged when the duty ratio is 0%, and the amount of engagement becomes zero when the duty ratio is 100% and the clutch is disengaged.

While the vehicle is traveling, for example, at the second speed in FIG. 5, if a shift instruction A is produced by the shift control device (or the shift lever operated by a driver) so as to shift to the third speed, then the clutch control device produces a duty ratio of 100% (in practice, the amount of engagement becomes zero being slightly delayed behind as shown) to disengage the clutch. At a moment the clutch is disengaged, the shift control device disengages the gears of the second speed, renders the transmission to be neutral, and brings the gear into engagement with the gear of the third speed through the synchronizing action by the synchronizing mechanism. In this step, the rotational speed of input shaft of the transmission sharply drops down to a rotational speed corresponding to that of the gear of the third speed.

Upon the output of the shift instruction, the control mode of the engine control device is changed from the accelerator pedal follow-up control over to the engine control at the time of shifting, the amount of fuel injection is decreased to meet a sharp decrease in the engine load as a result of disengaging the clutch to thereby prevent the engine rotational speed from sharply rising. In controlling the engine at the time of shifting, first, the amount of fuel injection is gradually decreased down to the amount of fuel nearly at the time of idling (graduation control) and, therefore, the amount of fuel is so controlled that the engine rotational speed approaches the rotational speed of the input shaft of the transmission at the third speed. At the time of shift down such as from the third speed to the second speed, the engine rotational speed is so controlled as to maintain the present state or to be increased by a predetermined amount.

At a moment the gears of the transmission are engaged, the clutch control device starts controlling the clutch so as to be engaged. In controlling the clutch so as to be engaged, a half-engage clutch control is executed by sharply decreasing the duty ratio down to about 0% for a short period of time (called "one-shot engagement") and, thereafter, returning the duty ratio back to the state of a so-called half-engaged clutch, and gradually decreasing the duty ratio again. The duty ratio is set to be nearly 0% for a short period of time from the standpoint of stabilizing the operation of a hydraulic piston of the clutch (wet type multiple disk clutch) so as to quickly arrive at the state of half-engaged clutch. In practice as shown, the amount of engagement quickly arrives at the start of the state where the clutch is half-engaged. In the state where the clutch is half-engaged, the amount of engagement gradually increases nearly according to a change in the duty ratio. This avoids a shift shock or an engine stall at the time of engaging the clutch.

As the amount of engaging the clutch increases in the half-engage clutch control, the engine rotational speed further decreases while the rotational speed of the input shaft of the transmission increases; i.e., the two rotational speeds gradually approach each other. At a moment (B) when the difference has reached a predetermined value, the control mode of the engine control device returns from the engine control at the time of shifting back to the accelerator pedal follow-up control, and a control is executed by using the amount the accelerator pedal is depressed by the driver as a basic parameter. At the time of returning back to the accelerator pedal follow-up control, too, a graduation control is executed for gradually increasing the amount of fuel injection.

DISCLOSURE OF THE INVENTION

Problems that the Invention is to Solve

In the accelerator pedal follow-up control that is executed when a vehicle is normally traveling, a basic amount of fuel injection is calculated depending upon the amount the accelerator pedal is depressed and the engine rotational speed. In modern engines, however, various limitations have been imposed on the amount of fuel injection so as to meet exhaust gas regulations. For example, upper-limit values (filters) have been set on the amount of fuel injection in order to suppress NOx emission and PM emission. In practice, the amount of engine fuel injection is determined as a minimum amount of fuel injection among basic amounts of fuel injection and among upper limits of the amounts of fuel injection due to various factors. As the exhaust gas regulations are becoming more stringent, however, the amounts of engine fuel injection in practice are more subject to be affected by such upper-limit values.

The upper limit of the amount of fuel injection is determined still depending upon the operating conditions of the engine such as the engine rotational speed and the like. In the engine control at the time of shifting, too, the upper limit of the amount of fuel injection is set depending upon the engine conditions such as the engine rotational speed, engine load and the like as well as the selected speed to which the gear is shifted. In the operation at the time of shifting shown in FIG. 5, therefore, a large difference often occurs on the amount of fuel injected into the engine being affected by a difference in the upper limit of the amount of fuel injection at the moment (B) when a difference between the engine rotational speed and the rotational speed of the input shaft of the transmission has reached a predetermined value, i.e., when the control mode of the engine control device returns from the engine control at the time of shifting back to the accelerator pedal follow-up control. In such a case, the torque of the engine varies due to a change in the amount of fuel injection, and this variation is transmitted to a power transmission device such as the transmission causing the occurrence of a shift shock.

The assignment of the present invention is to solve the above-mentioned problem at the time when the accelerator pedal follow-up control is to be resumed near the end of the shifting in an engine control device that executes the accelerator pedal follow-up control when normally traveling and executes the shifting engine control at the time of shifting.

Means for Solving the Problem

In view of the above assignment, the present invention provides the clutch control device with a timer means and changes a moment at which the timer means starts controlling the engagement of the clutch, in order to adjust the conditions of the engine when the engine control at the time of shifting returns back to the accelerator pedal follow-up control and to thereby prevent a change in the engine torque caused by a change in the amount of fuel injection at the time of change over. That is, the present invention is concerned with "a control device for a power transmission device for a vehicle having a clutch between an engine and a transmission, an input shaft of the clutch being coupled to the engine and an output shaft thereof being coupled to the transmission, wherein:

the clutch includes a clutch control device for controlling the amount of engagement thereof, and the clutch control device disengages the clutch at the time of shifting and after the shifting has been completed, executes a half-engage clutch control for engaging the clutch while gradually increasing the amount of engagement thereof;

the engine includes an engine control device that executes an accelerator pedal follow-up control using the amount the accelerator pedal is depressed as a basic parameter and at the time of shifting, the engine control device executes a shifting engine control for controlling the engine independently of the amount the accelerator pedal is depressed and, thereafter, resumes the accelerator pedal follow-up control at a moment when a difference between the engine rotational speed and the rotational speed of the clutch output shaft has reached a predetermined value; and the clutch control device includes a timer means which starts counting the time at a moment when the clutch is disengaged at the time of shifting, and the clutch control device starts controlling the clutch so as to be engaged before the end of a period determined by the timer means and sets the period determined by the timer means depending upon the conditions of the engine at the time of shifting".

As described in claim 2, it is desired that the period determined by the timer means is set depending upon the engine rotational speed at the time of shifting and the selected speed. As described in claim 3, further, the invention is suited for a power transmission device for a vehicle having a fluid coupling interposed between the engine and the clutch.

Effects of the Invention

The clutch control device of the invention is provided with a timer means that starts counting the time at a moment when the clutch is disengaged at the time of shifting, and starts controlling the clutch so as to be engaged at the end of a period determined by the timer means. The whole time width that can be set by the timer means is relatively as short as about 100 ms, and the moment for starting the clutch control so as to be engaged is variably adjusted within this time.

In the conventional clutch control device as shown in FIG. 5, the control operation starts so as to bring the clutch into engagement nearly simultaneously with the engagement of gears of the transmission. According to the present invention, on the other hand, the control operation for bringing the clutch into engagement is delayed by, for example, a predetermined period of time by the timer means so that the amount of engaging the clutch increases being delayed behind correspondingly in the half-engage clutch control operation. The rotational speed of the clutch output shaft sharply decreases after the clutch is disengaged and becomes equal to the rotational speed of the input shaft of the transmission at the third-speed gear. Here, if the amount of engaging the clutch increases in a delayed manner, then the rotational speed of the clutch output shaft increases in a delayed manner, too. Further, at a moment when the control mode is changed over, i.e., when the difference between the engine rotational speed and the rotational speed of the clutch output shaft has reached a predetermined value, the engine rotational speed is slower than that of when there is no delay. That is, the engine control at the time of shifting is returned back to the accelerator pedal follow-up control in a state of a decreased engine rotational speed, substantially eliminating a variation in the torque that stems from a difference in the upper limit values of the amounts of fuel injection in the two control modes, and avoiding the occurrence of shift shock.

The period set by the timer means is determined depending upon the conditions of the engine such as the engine rotational speed at the time of shifting and the like by using, for example, a map. Therefore, the engine rotational speed of when the engine control at the time of shifting is changed over to the accelerator pedal follow-up control can be set to an optimum rotational speed depending upon the shifting state. The median value of the whole time width of the timer means is set as an optimum value in the shifting operation that highly frequently occurs while the vehicle is traveling, i.e., is set as a time for starting the engagement control that is not substantially adversely affected by a variation in the engine torque and that enables the control mode to be changed over in the shortest period of time. Generally, the clutch engagement control is in many cases started at a value greater than the median value (delayed) to avoid variation in the torque, such as when the second speed is shifted up to the third speed causing the engine rotational speed to decrease after shifted. In the case of shift down, however, the time is set by the timer to be often smaller than the median value to advance the start of the clutch engagement control ahead of the normal timing.

When the period determined by the timer means is set depending upon the engine rotational speed at the time of shifting and the selected speed as in the invention of claim 2, the engine rotational speed at the time of returning back to the accelerator pedal follow-up control can be precisely controlled depending upon the shifting state. Further, when the invention is applied to a power transmission device for a vehicle having a fluid coupling between the engine and the clutch as in the invention of claim 3, variation in the engine torque is absorbed by the fluid coupling at the start of the vehicle, variation in the torque is eliminated at the time of shifting, too, and the vehicle is allowed to travel free of shock that stems from variation in the torque throughout the whole range of traveling.

BEST MODE FOR CARRYING OUT THE INVENTION

An embodiment of the invention will now be described in detail with reference to the drawings.

Figure 4:
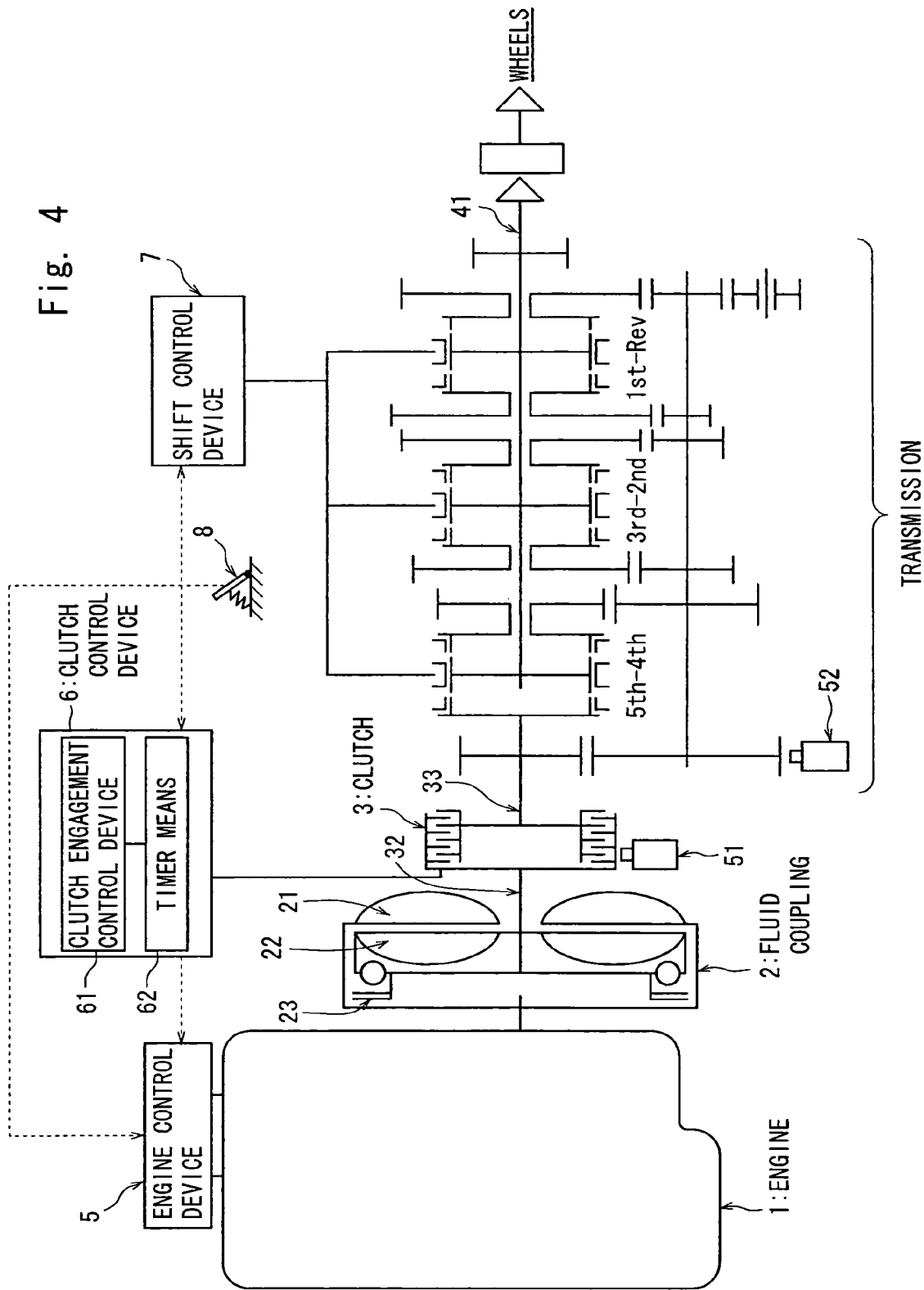
FIG. 4 is a whole block diagram of the power transmission device for a vehicle of the present invention.

Referring to FIG. 4 illustrating the whole constitution of the power transmission device for a vehicle and the control device therefor according to an embodiment of the present invention, the power transmission device is constituted by an engine (diesel engine) 1, a fluid coupling 2, a clutch (wet type multiple disk clutch) 3 and a transmission 4 that are coupled in the axial direction. An output shaft of the engine 1 is integrally fixed to a pump 21 of the fluid coupling 2, and an input shaft 32 of the clutch 3 is fixed to an output shaft of a turbine 22 facing the pump 21. Further, an output shaft 33 of the clutch 3 is integrally fixed to an input shaft of the transmission 4, and an output shaft 41 of the transmission 4 is coupled to the wheels that are not shown.

The fluid coupling 2 is provided with a lockup clutch 23 for fastening the turbine 22 and the pump 21 integrally together. The fluid coupling 2 is for smoothly starting the vehicle by utilizing the slipping between the pump 21 and the turbine 22 at the time of start. Except the moment of starting the vehicle, the lockup clutch 23 is engaged to fasten the pump 21 and the turbine 22 together. After having reached the traveling state where the speed of the vehicle can be shifted, therefore, the output shaft of the engine 1 is directly coupled to the input shaft 32 of the clutch 3.

The power transmission device is equipped with a control device for controlling every device. The control device is constituted by an engine control device 5 which, when normally traveling, executes an accelerator pedal follow-up control using the amount the accelerator pedal 8 is depressed as a basic parameter and, at the time of shifting, executes a shifting engine control for controlling the engine 1 independently of the amount the accelerator pedal 8 is depressed, a clutch control device 6 for controlling the operation of the clutch 3 that connects and disconnects the transmission of power between the engine 1 and the transmission 4, and a shift control device 7 for controlling the operation of the transmission 4. The control device is, further, provided with a sensor 51 for detecting the rotational speed of the clutch input shaft 32 and a sensor 52 for detecting the rotational speed of the transmission input shaft. Constitutions of the above devices in the power transmission device and the basic control mode of the control device are the same as those of the power transmission device disclosed in the patent document 1.

The clutch control device 6 in the power transmission device of the present invention includes a clutch engagement control device 61 for executing a "one-shot engagement" and a half-engage clutch control after the gears have been engaged at the time of shifting, and a timer means 62 for setting a moment for starting the clutch engagement control. The timer means 62 is so constituted as to start counting the time at a moment when the clutch is disengaged at the time of shifting, e.g., at a moment when the gears are engaged, and to start the control so as to engage the clutch at the end of the period determined by the timer means. In other words, the clutch control device 6 does not operate during the period set by the timer means.

Figure 1:
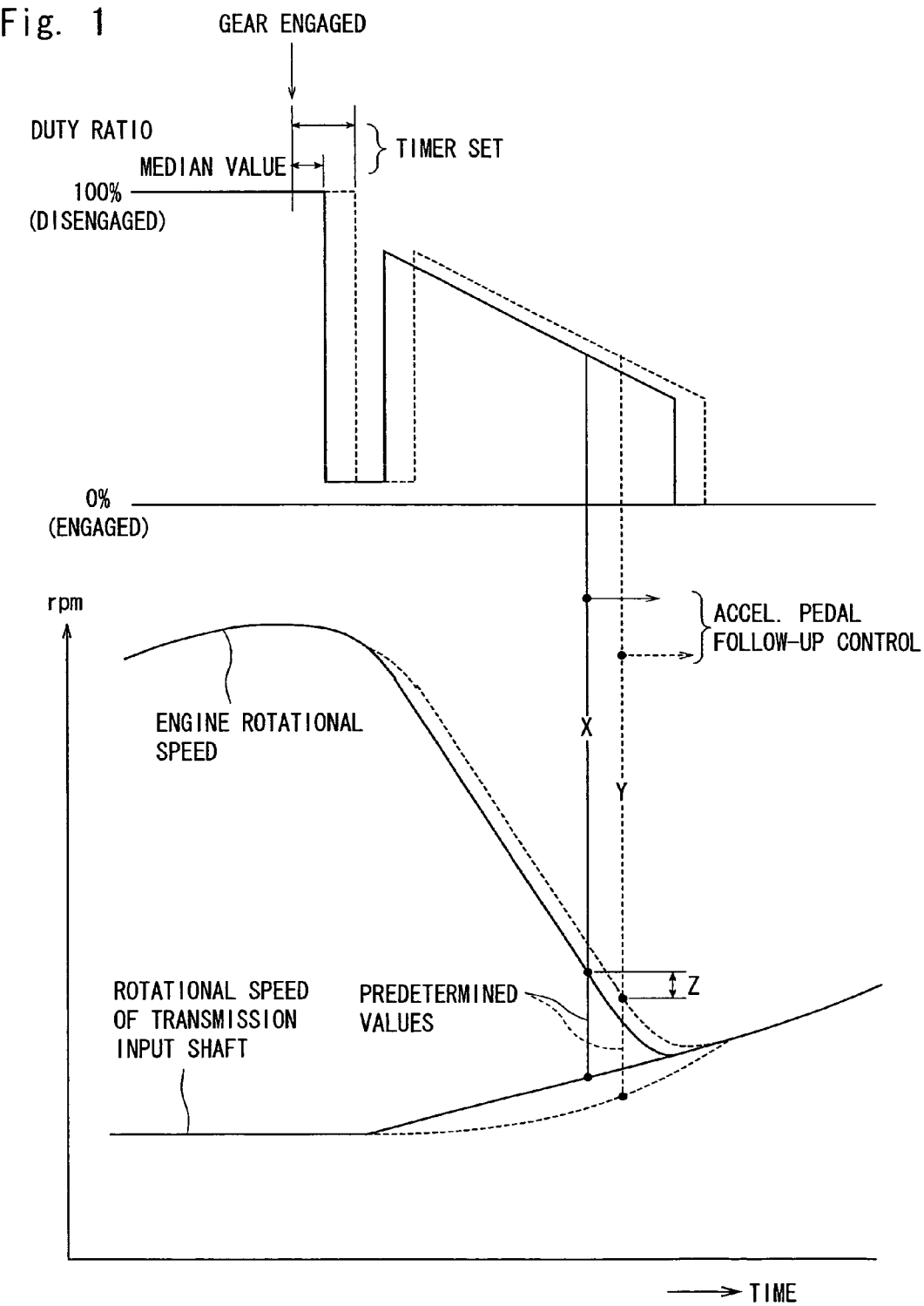
FIG. 1 is a diagram of control timings in a power transmission device for a vehicle of the present invention.

The operation of the clutch control device 6 of the invention will now be described with reference to FIG. 1. FIG. 1 is a timing diagram illustrating operation characteristics similar to those of FIG. 5, and its upper portion illustrates a change in the amount of engaging the clutch (duty ratio) with the passage of time and its lower portion illustrates changes in the rotational speed of the clutch input shaft (engine rotational speed) and in the rotational speed of the clutch output shaft (rotational speed of the transmission input shaft) at the time of shifting with the passage of time.

As represented by the characteristics of change in the duty ratio with the passage of time, the timer means 61 starts counting the time at a moment when the engagement of gears of the transmission is completed at the time of shifting. The period set by the timer is determined by a map depending, at least, upon the engine rotational speed at the time when the gears engage. Solid lines in the drawing represent characteristics of when the clutch engagement control is started nearly at the median value (e.g., 50 ms) of the time width of the timer means, and broken lines represent characteristics of when the clutch engagement control is started at a moment that is delayed behind.

Figure 5:
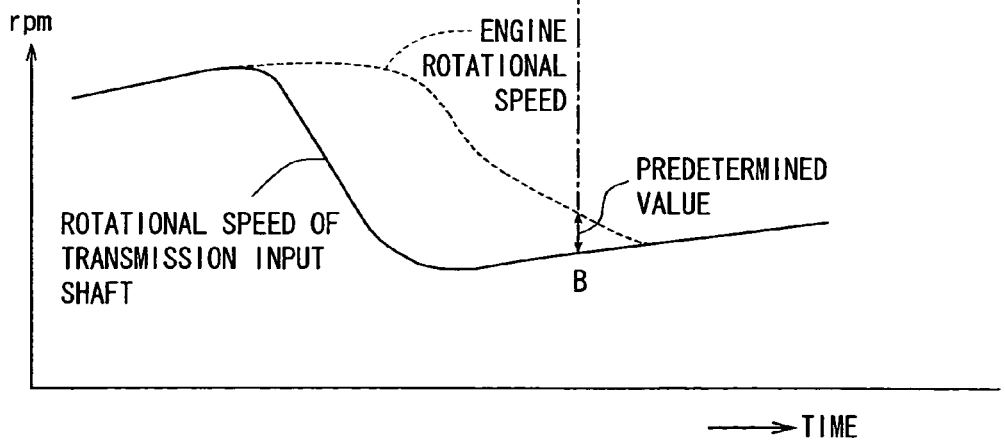
FIG. 5 is a diagram of control timings in a conventional power transmission device for a vehicle.

Upon the start of engagement control, the clutch control device 6 executes a half-engage clutch control after the "one-shot engagement" like in the characteristics of FIG. 5, and the amount of engagement increases nearly correspondingly to the duty ratio. When the engagement control is started at the median value of the timer means 62, the rotational speed of the engine and the rotational speed of the transmission input shaft vary along the solid lines in the drawing and when a difference between them has reached a predetermined value at (X), the engine control device 1 changes the control mode from the shifting engine control over to the accelerator pedal follow-up control. On the other hand, when the engagement control is started being delayed behind the median value of the timer means 62, the amount of engaging the clutch increases being delayed and, therefore, the engine rotational speed decreases being delayed. Moreover, the rotational speed of the transmission input shaft increases being further delayed due to the inertia of the vehicle and the like. Therefore, the engine rotational speed at a moment (Y) when the difference between the two has reached a predetermined value becomes lower by (Z) than that of when the engagement control is started at the median value of the timer means 62, and approaches the engine rotational speed of after the clutch has engaged.

Figure 2:
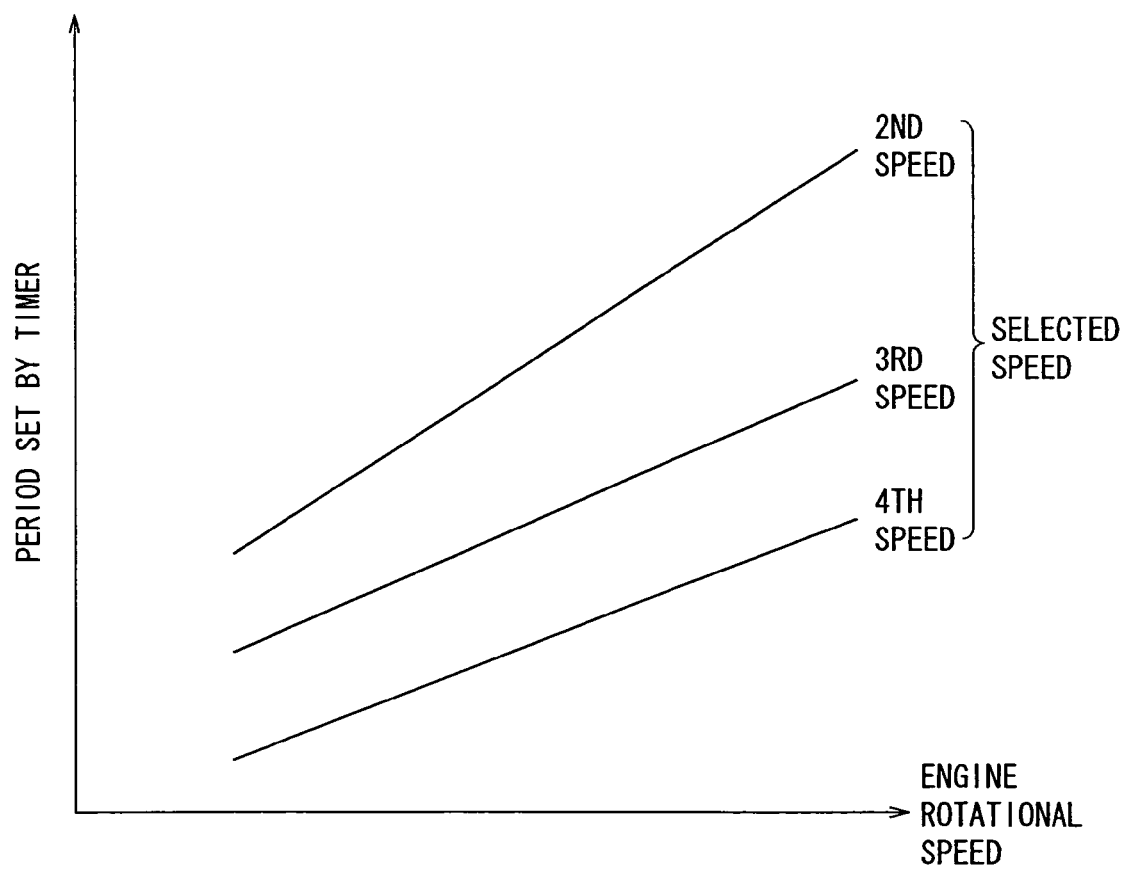
FIG. 2 is a map used in an embodiment of the present invention.

The period set by the timer means 62 is determined depending, at least, upon the engine conditions such as the engine rotational speed and the like. The period, however, may be determined depending upon the engine rotational speed and the selected speed by using a map shown in FIG. 2. The map of FIG. 2 is prepared by finding the moments for starting the engagement control that is not adversely affected by variation in the engine torque and that enables the control mode to be changed over within the shortest period of time depending upon the engine rotational speeds and the selected speeds through experiments. This makes it possible to set the engine rotational speed at a moment of changing the shifting engine control over to the accelerator pedal follow-up control to an optimum rotational speed depending upon the shifting state, and substantially eliminates variation in the torque caused by a difference in the upper limits of the amounts of fuel injection in the two control modes. The median value of the time width of the timer means is set to an optimum value in the shifting operation that is highly frequently executed while the vehicle is traveling. Depending upon the shifting conditions, the period to be set by the timer may be selected to be smaller than the median value.

Figure 3:
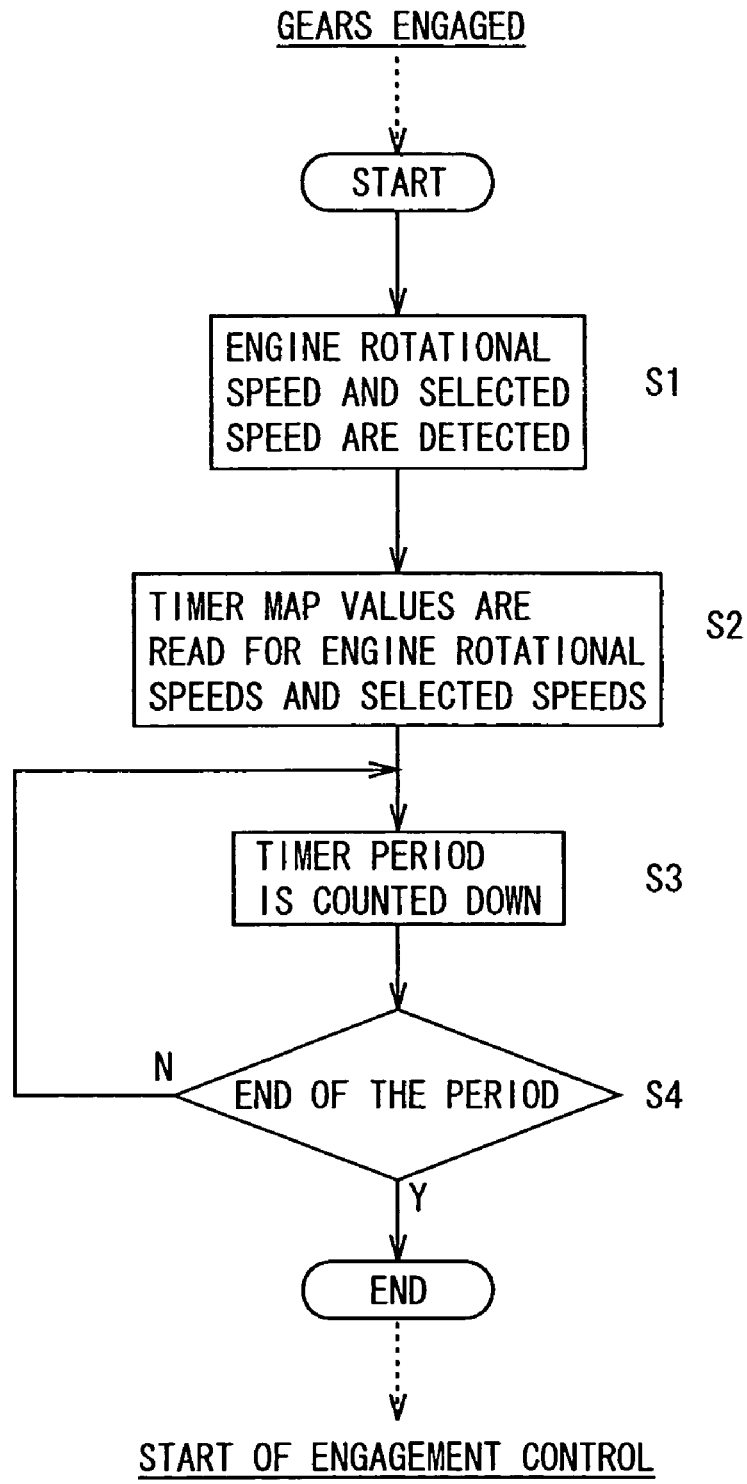
FIG. 3 is a flowchart illustrating an operation procedure of a control device of the present invention.

FIG. 3 is a flowchart illustrating a procedure of operation of the timer means according to the present invention. When the transmission is shifted (gears are engaged), the engine rotational speed and the selected speed are detected (S1), and the period is set by the timer by using the map of FIG. 2 (S2). Next, the timer period is counted down (S3, S4), and the clutch engagement control starts at a moment when the set period is reached. The clutch is substantially disengaged even in the time band of "one-shot engagement". Depending upon the cases, the timer means can be operated in this time band.

INDUSTRIAL APPLICABILITY

As described above in detail, the present invention is concerned with a power transmission device for a vehicle equipped with an engine control device which when normally traveling, executes an accelerator pedal follow-up control and at the time of shifting, executes a shifting engine control, wherein a moment for starting the clutch engagement control is varied by a timer means which is provided for a clutch control device, in order to adjust the conditions of the engine at the time of resuming the accelerator pedal follow-up control and to prevent variation in the engine torque caused by variation in the amount of fuel injection at the time of resuming the control operation. Therefore, the present invention can be utilized for a variety kinds of vehicles as a control device for a power transmission device equipped with the engine, clutch and transmission.

Though the above embodiment has illustrated the power transmission device having the fluid coupling interposed between the engine and the clutch, it needs not be pointed out that the invention can further be applied to a power transmission device which is not equipped with the fluid coupling, as a matter of course. It will, further, be obvious that the above embodiment can be variously modified such as controlling the amount of engaging the clutch by using an analog control means instead of using a control means based on a duty ratio.

The invention claimed is:

1. A control device for a power transmission device for a vehicle having a clutch between an engine and a transmission, an input shaft of said clutch being coupled to said engine and an output shaft thereof being coupled to said transmission, wherein:

said clutch includes a clutch control device for controlling the amount of engagement thereof, and said clutch control device disengages said clutch at the time of shifting and after the shifting has been completed, executes a half-engage clutch control for engaging said clutch while gradually increasing the amount of engagement thereof;

said engine includes an engine control device that executes an accelerator pedal follow-up control using the amount the accelerator pedal is depressed as a basic parameter and at the time of shifting, said engine control device executes a shifting engine control for controlling said engine independently of the amount the accelerator pedal is depressed and, thereafter, resumes said accelerator pedal follow-up control at a moment when a difference between the engine rotational speed and the rotational speed of said clutch output shaft has reached a predetermined value; and said clutch control device includes a timer means which starts counting the time at a moment when said clutch is disengaged at the time of shifting, and said clutch control device starts controlling said clutch so as to be engaged before the end of a period determined by said timer means and sets the period determined by said timer means depending upon the conditions of the engine at the time of shifting.

2. The control device for a power transmission device for a vehicle according to claim 1, wherein the period determined by said timer means is set depending upon the engine rotational speed at the time of shifting and the selected speed.

3. The control device for a power transmission device for a vehicle according to claim 1, wherein said power transmission device for a vehicle has a fluid coupling interposed between said engine and said clutch.

4. The control device for a power transmission device for a vehicle according to claim 2, wherein said power transmission device for a vehicle has a fluid coupling interposed between said engine and said clutch.

* * * * *